United States Patent [19]
Calabrese et al.

[11] 3,972,479
[45] Aug. 3, 1976

[54] JET INTERACTION NOZZLE

[75] Inventors: Richard A. Calabrese, Los Angeles; Ellis G. Estes, Redondo Beach; Dean F. Hopkins, Costa Mesa; Walter W. Johnson, Malibu, all of Calif.

[73] Assignee: The United States of America as represented by the Secretary of the Army, Washington, D.C.

[22] Filed: Apr. 30, 1975

[21] Appl. No.: 573,184

[52] U.S. Cl. ............................. 239/265.11; 60/271; 239/593; 239/DIG. 19
[51] Int. Cl.² ...................... B64D 33/04; F02K 1/22
[58] Field of Search ................... 239/265.11, 265.19, 239/591, 593, DIG. 19, 265.35; 115/11, 12 R, 12 A; 114/151; 60/271, 232

[56] References Cited
UNITED STATES PATENTS

| | | | |
|---|---|---|---|
| 471,274 | 3/1892 | Pahtz | 115/11 X |
| 1,698,822 | 1/1929 | Paxton | 239/265.35 |
| 2,297,239 | 9/1942 | Neugebauer et al. | 60/271 X |
| 2,879,014 | 3/1959 | Smith et al. | 239/265.35 X |
| 3,194,013 | 7/1965 | Dagneau et al. | 239/265.11 |
| 3,428,257 | 2/1969 | Kentfield et al. | 60/232 X |

FOREIGN PATENTS OR APPLICATIONS 763,236   12/1956   United Kingdom.................. 60/271

OTHER PUBLICATIONS

Astrolite, H. I. Thompson, Fiber Glass Co., Products Bulletin, No. PB 7–24A, July 1, 1959.

*Primary Examiner*—John J. Love
*Assistant Examiner*—Andres Kashnikow
*Attorney, Agent, or Firm*—Lawrence A. Neureither; Jack W. Voigt; Herbert H. Murray

[57] ABSTRACT

A thruster nozzle for a vehicle control system having a circular cross section inlet and an enlongated slot shaped cross section outlet with a gradual transition from one to the other, coupled with a cant angle between the axis of the inlet and the axis of the outlet.

1 Claim, 6 Drawing Figures

JET INTERACTION NOZZLE

BACKGROUND OF THE INVENTION

In order to obtain maximum effect from the gases exiting from a nozzle on the attitude of the vehicle it is desirable to have an interaction between the supersonic approximately 2600°F gas generator combustion products flow from the nozzle with the vehicle aerodynamic freestream. In order to accomplish this function the nozzle throat and exit cone must be in the form of a slot with a high aspect ratio, length to width ratio. Also the nozzle must exit through and be flush with the vehicle skin and the nozzle centerline must be canted forward into the airstream.

In accordance with the need, it is an object of this invention to provide a nozzle that can perform the above functions.

DETAILED DESCRIPTION OF THE INVENTION

Figure 1:
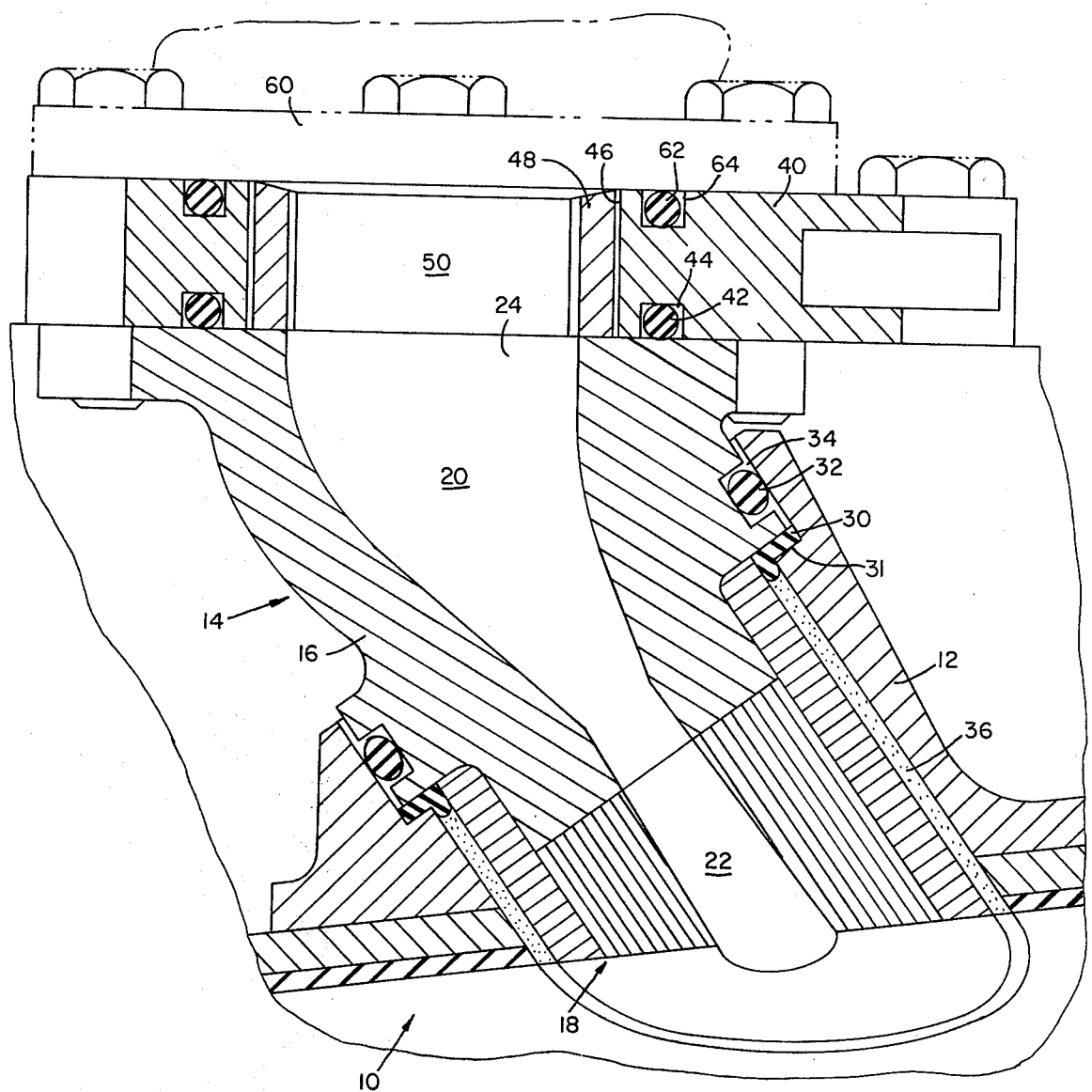
FIG. 1 is a section through a nozzle of the present invention.
Figure 2:
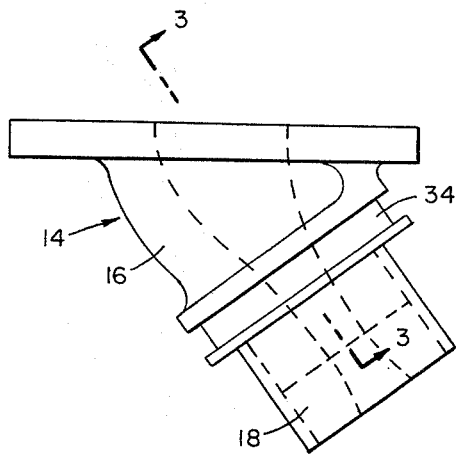
FIG. 2 is a side elevation of the nozzle of FIG. 1.
Figure 3:
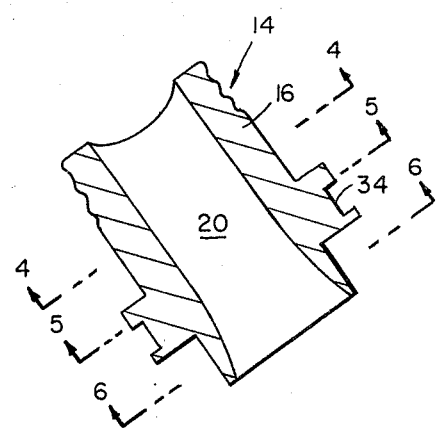
FIG. 3 is a section taken on line 3—3 of FIG. 2.

Referring now to the drawings and particularly FIG. 1 thereof, 10 generally indicates the outer skin of the vehicle. A boss 12 is mounted on the inner surface of the vehicle skin 10 and the nozzle 14 of the present invention is mounted therein in a manner described below.

The nozzle 14 is composed of a metallic section 16 of titanium and an exit section 18 of quartz phenolic exit cone. The quartz phenolic exit cone 18 is constructed from quartz cloth impregnated with phenolic resin and laid up in a flat wrap for hoop strength. The exit cone is formed with considerable length and is then shaved to fit flush with the outer skin configuration after the nozzle is installed.

Figure 4:
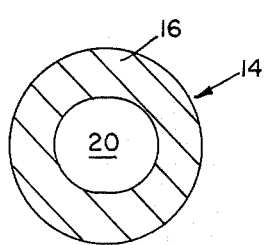
FIG. 4 is a section taken on line 4—4 of FIG. 3.
Figure 5:
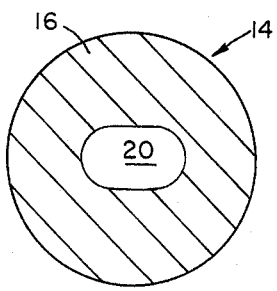
FIG. 5 is a section taken on line 5—5 of FIG. 3.
Figure 6:
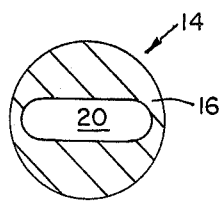
FIG. 6 is a section taken on line 6—6 of FIG. 3.

The titanium portion 16 is provided with a central passageway 20 which gradually changes from a circular cross section to a slot cross section as is best seen in the sectional views of FIGS. 4 through 6. The slot cross section continues through the exit cone 18 as indicated at 22.

Simultaneous with the change in cross section of passageway 22 the flow axis through the nozzle changes direction from a position wherein longitudinal flow axis of the inlet 24 of passageway 20 is radial to the vehicle to a position wherein the longitudinal flow axis of the exit of passageway 20 is inclined forward with respect to the vehicle about 36°.

When the nozzle 14 is mounted in the boss 12 a special gasket 30 seals between the lower end of the titanium portion 16 and abuts against a shoulder 31 in the boss 12. An O-ring 32 is mounted within groove 34 on the outer surface of titanium section 16 and abuts the inner wall of the boss 12. The space between the quartz phenolic section 18 and the boss 12 is filled with a thermal ablative material 36 for thermal protection. The O-ring 32, the gasket 30 and the thermal ablative filler 36 form an aerodynamic seal between the nozzle and the boss 12 of the vehicle frame.

A nozzle adapter 40 is fixed to the inner end of the nozzle and sealed thereto by an O-ring 42 mounted in a groove 44 framed in the adapter. A central passageway 46 in the adapter 40 receives an adapter sleeve 48 having a passageway 50 therethrough which matches the inlet opening 24 of the passageway 20 through the nozzle 14.

A flow control valve 60 is fixed to the adapter 40 and is sealed thereto by an O-ring 62 mounted in a groove 64 formed in the adapter. The flow control valve 60 controls the flow of 2600°F gas generator combustion products from a gas generator not shown through the nozzle 14.

We claim:
1. A thruster jet for use with a vehicle,
said thruster jet comprising a titanium nozzle section having a flow passage therethrough and a relatively long exit extension fastened to the exit of said titanium section and projecting along the same longitudinal axis as the axis of the exit portion of said titanium section,
said flow passage having an inlet portion of circular cross section and an exit of slot shaped cross section,
said exit portion having a high length to width aspect ratio,
a smooth gradual transition between the inlet and exit portions of said flow passage from said circular cross section to said slot cross section,
a gradual bend in said flow passage between the inlet and exit ends thereof so that the longitudinal axis of the exit is canted forward with respect to the longitudinal axis of said inlet,
said exit extension being shaved to the exterior contour of the vehicle in which the nozzle is installed after installation thereof,
said extension being made of quartz cloth impregnated with phenolic resin.

* * * * *